(12) United States Patent
Baum

(10) Patent No.: US 9,454,763 B2
(45) Date of Patent: Sep. 27, 2016

(54) DISTRIBUTION OF OFFER TO A SOCIAL GROUP BY SHARING BASED ON QUALIFICATIONS

(75) Inventor: Geoff Baum, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 228 days.

(21) Appl. No.: 12/862,386

(22) Filed: Aug. 24, 2010

(65) Prior Publication Data

US 2013/0132220 A1    May 23, 2013

(51) Int. Cl.
*G06Q 30/00* (2012.01)
*G06Q 30/02* (2012.01)
*G06Q 30/06* (2012.01)
*G06Q 50/00* (2012.01)

(52) U.S. Cl.
CPC .......... *G06Q 30/02* (2013.01); *G06Q 30/0214* (2013.01); *G06Q 30/0251* (2013.01); *G06Q 30/06* (2013.01); *G06Q 50/01* (2013.01)

(58) Field of Classification Search
CPC .......................... G06Q 30/02–30/0284; G06Q 30/06–30/0645; G06Q 30/08; G06Q 50/01
USPC .......................... 705/14–14.73, 26–27.2, 319
See application file for complete search history.

(56) References Cited

U.S. PATENT DOCUMENTS

| | | |
|---|---|---|
| 5,636,346 A | 6/1997 | Saxe |
| 5,892,900 A | 4/1999 | Ginter et al. |
| 6,061,658 A | 5/2000 | Chou et al. |
| 6,317,872 B1 | 11/2001 | Gee et al. |
| 6,519,571 B1 | 2/2003 | Guheen et al. |
| 7,072,858 B1 | 7/2006 | Litzow et al. |
| 7,174,381 B2 | 2/2007 | Gulko et al. |
| 7,224,185 B2 | 5/2007 | Campbell et al. |
| 7,599,851 B2 | 10/2009 | Frengut et al. |
| 7,992,171 B2 * | 8/2011 | Amidon et al. ............... 725/50 |
| 8,326,630 B2 * | 12/2012 | Chandrasekar et al. ...... 704/270 |
| 8,630,902 B2 | 1/2014 | Baum |
| 8,635,107 B2 | 1/2014 | Chang |
| 8,635,226 B2 | 1/2014 | Chang |
| 8,700,468 B2 | 4/2014 | Chang et al. |
| 8,799,060 B2 * | 8/2014 | Gillenson et al. ........... 705/14.1 |
| 9,177,327 B2 | 11/2015 | Chang |

(Continued)

FOREIGN PATENT DOCUMENTS

| | | |
|---|---|---|
| CN | 1535535 | 10/2004 |
| CN | 101438308 | 5/2009 |

(Continued)

OTHER PUBLICATIONS

"Final Office Action", U.S. Appl. No. 13/039,177, (Dec. 12, 2012), 20 pages.

(Continued)

*Primary Examiner* — Adam Levine
(74) *Attorney, Agent, or Firm* — Wolf-SBMC

(57) ABSTRACT

A group offer is provided to a first-level recipient that meets a set of criteria. Further, the group offer is activated upon a consumer participant threshold being met, the consumer participant threshold equaling a number of consumers. In addition, a social incentive structure is established that provides a reward to the first-level recipient if the first-level recipient shares the group offer with a second-level recipient that (i) is in a social circle associated with the first-level recipient and (ii) meets a set of qualifications.

20 Claims, 5 Drawing Sheets

(56) References Cited

U.S. PATENT DOCUMENTS

| | | | |
|---|---|---|---|
| 2001/0013009 A1 | 8/2001 | Greening et al. | |
| 2001/0032128 A1 | 10/2001 | Kepecs | |
| 2003/0023482 A1 | 1/2003 | Messner et al. | |
| 2005/0114366 A1 | 5/2005 | Mathai et al. | |
| 2006/0095327 A1 | 5/2006 | Vaughn et al. | |
| 2006/0212355 A1* | 9/2006 | Teague et al. | 705/14 |
| 2007/0230706 A1 | 10/2007 | Youn | |
| 2008/0090513 A1 | 4/2008 | Collins et al. | |
| 2008/0103903 A1 | 5/2008 | Flake | |
| 2008/0163071 A1 | 7/2008 | Abbott et al. | |
| 2009/0006188 A1 | 1/2009 | Guo et al. | |
| 2009/0132275 A1 | 5/2009 | Jung | |
| 2009/0164441 A1 | 6/2009 | Cheyer | |
| 2009/0254971 A1 | 10/2009 | Herz et al. | |
| 2009/0271263 A1 | 10/2009 | Regmi et al. | |
| 2010/0042471 A1* | 2/2010 | Chang et al. | 705/10 |
| 2010/0094878 A1 | 4/2010 | Soroca et al. | |
| 2010/0106568 A1 | 4/2010 | Grimes | |
| 2010/0138867 A1 | 6/2010 | Wong et al. | |
| 2010/0211464 A1 | 8/2010 | Zhu et al. | |
| 2010/0268600 A1 | 10/2010 | Banko et al. | |
| 2011/0270618 A1 | 11/2011 | Banerjee | |
| 2012/0226559 A1 | 9/2012 | Baum et al. | |
| 2012/0226562 A1 | 9/2012 | Baum et al. | |
| 2012/0226697 A1 | 9/2012 | Chang et al. | |
| 2012/0226700 A1 | 9/2012 | Chang et al. | |
| 2013/0132365 A1 | 5/2013 | Chang | |
| 2016/0048885 A1 | 2/2016 | Chang et al. | |

FOREIGN PATENT DOCUMENTS

| | | |
|---|---|---|
| CN | 101520878 | 9/2009 |
| CN | 101535944 | 9/2009 |
| CN | 101694659 | 4/2010 |
| CN | 101855647 | 10/2010 |
| CN | 102708130 | 10/2012 |
| CN | 102708131 | 10/2012 |
| CN | 102722833 | 10/2012 |
| CN | 102737333 | 10/2012 |
| CN | 102737334 | 10/2012 |

OTHER PUBLICATIONS

"Final Office Action", U.S. Appl. No. 13/039,207, (Dec. 31, 2012), 13 pages.

"Final Office Action", U.S. Appl. No. 13/039,242, (Jan. 2, 2013), 12 pages.

"Final Office Action", U.S. Appl. No. 13/039,257, (Jan. 3, 2013), 12 pages.

Dattero, Ronald et al., "Programming Languages of the ACM, vol. 47, No. 1, (Jan. 2004), pp. 99-102 and Gender", Communications.

Lam, Wang "The Behavior of NULLs in SQL", Retrieved from: <http://www-cs-students.stanford.edu/'wlam/compsci/sqlnulls> on Dec. 26, 2012, (Aug. 5, 2004), 4 pages.

"Final Office Action", U.S. Appl. No. 13/153,328, (Dec. 3, 2012), 14 pages.

"Lawson M3 Manufacturing Operations: Attribute Control", Lawson Software, Inc. 5636346,(2008), 12 pages.

"Non-Final Office Action", U.S. Appl. No. 13/039,177, (Sep. 10, 2012), 19 pages.

"Non-Final Office Action", U.S. Appl. No. 13/039,207, (Sep. 13, 2012), 16 pages.

"Non-Final Office Action", U.S. Appl. No. 13/039,242, (Jun. 8, 2012), 10 pages.

"Non-Final Office Action", U.S. Appl. No. 13/039,257, (Jul. 18, 2012), 10 pages.

"Non-Final Office Action", U.S. Appl. No. 13/153,328, (Jun. 8, 2012), 8 pages.

"SQL Tutorials—Lesson 1: SQL Startup", Retrieved from: <http://www.functionx.com/sql/Lesson01.htm> on Aug. 20, 2012,(2004-2007), 4 pages.

De Haan, Lex et al., "Nulls: Nothing to Worry About", Retrieved from: <http://www.oracle.com/technetwork/issue-archive/2005/05-jul/o45sql-097727.html> on Aug. 20, 2012,(Jul. 2005), 1 page.

Preiss, Bruno R., "Data Structures and Algorithms with Object-Oriented Design Patterns in Java", Retrieved from: <http://www.brpreiss.com/books/opus5/html/page264.html> on Aug. 20, 2012,(1998), 2 pages.

"Final Office Action", U.S. Appl. No. 13/039,266, (Aug. 5, 2013), 14 pages.

"Non-Final Office Action", U.S. Appl. No. 13/039,266, (Mar. 12, 2013),12 pages.

"Non-Final Office Action", U.S. Appl. No. 13/153,328, (Mar. 20, 2013),13 pages.

"Notice of Allowance", U.S. Appl. No. 13/039,257, Sep. 12, 2013, 14 pages.

"Notice of Allowance", U.S. Appl. No. 13/039,177, Sep. 4, 2013, 7 pages.

"Notice of Allowance", U.S. Appl. No. 13/153,328, Sep. 4, 2013, 7 pages.

"Notice of Allowance", U.S. Appl. No. 13/039,207, Dec. 23, 2013, 8 pages.

Wen-Xi U, et al.,' "Market basket analysis based on text segmentation and association rule mining", First International Conference on Networking and Distributed Computing, Oct. 2010, pp. 309-313.

"Non-Final Office Action", U.S. Appl. No. 13/039,242, Dec. 17, 2014, 11 pages.

"Final Office Action", U.S. Appl. No. 13/039,266, Oct. 16, 2015, 15 pages.

"Non-Final Office Action", U.S. Appl. No. 13/039,266, May 22, 2015, 14 pages.

"Notice of Allowance", U.S. Appl. No. 13/039,242, May 28, 2015, 8 pages.

* cited by examiner

DISTRIBUTION OF OFFER TO A SOCIAL GROUP BY SHARING BASED ON QUALIFICATIONS

BACKGROUND

1. Field

This disclosure generally relates to a network. More particularly, the disclosure relates to social interaction over a network.

2. General Background

Online group buying tools are becoming increasing popular as a way for merchants to attract new customers. In a typical group buying scenario, a company will provide a highly discounted offer for a product or a service. The offer is distributed to consumers that match an attribute, or a set of attributes, defined by a merchant and provided by the merchant to the company. The consumers that match the attributes are deemed to be the group. For example, the offers may be delivered to consumers that live in a specific geographical region and have signed up to receive e-mails from the company. However, the success of a particular promotion is typically short term.

SUMMARY

In one aspect of the disclosure, a computer program product is provided. The computer program product includes a computer useable medium having a computer readable program. The computer readable program when executed on a computer causes the computer to provide a group offer to a first-level recipient that meets a set of criteria. Further, the computer readable program when executed the computer causes the computer to activate the group offer upon a consumer participant threshold being met, the consumer participant threshold equaling a number of consumers. In addition, the computer readable program when executed the computer causes the computer to establish a social incentive structure that provides a reward to the first-level recipient if the first-level recipient shares the group offer with a second-level recipient that (i) is in a social circle associated with the first-level recipient and (ii) meets a set of qualifications.

In another aspect of the disclosure, a process is provided. The process provides, with a processor, a group offer to a first-level recipient that meets a set of criteria. Further, the process provides, with the processor, the group offer upon a consumer participant threshold being met, the consumer participant threshold equaling a number of consumers. In addition, the process establishes, with the processor, a social incentive structure that provides a reward to the first-level recipient if the first-level recipient shares the group offer with a second-level recipient that (i) is in a social circle associated with the first-level recipient and (ii) meets a set of qualifications.

In yet another aspect of the disclosure, a system is provided. The system includes a server that (i) provides a group offer to a first-level recipient that meets a set of criteria, (ii) activates the group offer upon a consumer participant threshold being met, (iii) establishes a social incentive structure that provides a reward to the first-level recipient if the first-level recipient shares the group offer with a second-level recipient that is in a social circle associated with the first-level recipient and meets a set of qualifications, and (iv) generates a unique e-mail and a unique offer for the second-level recipient. The consumer participant threshold equals a number of consumers. Further, the system includes a database that stores the unique e-mail and the unique offer.

In another aspect of the disclosure, a computer program product is provided. The computer program product includes a computer useable medium having a computer readable program. The computer readable program when executed on a computer causes the computer to provide a set of data to a first-level recipient that meets a set of criteria. The first-level recipient is a member of an online social network. Further, the computer readable program when executed on the computer causes the computer to establish a social incentive structure that provides (i) a reward to the first-level recipient if the first-level recipient shares the set of data with a second-level recipient that is in the social network and meets a set of qualifications, and provides (ii) a penalty to the first-level recipient if the first-level recipient shares the set of data with a different second-level recipient that is in the social network without meeting the set of qualifications.

DRAWINGS

The above-mentioned features of the present disclosure will become more apparent with reference to the following description taken in conjunction with the accompanying drawings wherein like reference numerals denote like elements and in which.

DETAILED DESCRIPTION

A social group buying method, system, and computer program product are provided to effectively reward consumers in a group for sharing an offer with other consumers to increase the number of qualified consumers participating in the group. As a result, the long term success of a merchant's promotion may be enhanced. For example, social group buying may provide an efficient way for merchants to encourage and reward consumers to share relevant group buying offers with other consumers such as pre-qualified friends and family members that meet the merchant's target criteria.

In one embodiment, the consumer is incentivized through a reward mechanism to pre-qualify the people with whom he or she shares an offer based on one or more attributes defined by one or more merchants. This efficient approach helps reduce spamming as the entity providing the offer, i.e., the merchant or an entity working on behalf of the merchant, may reduce the amount of e-mail sent to obtain new customers. Further, the quality of participants in the offer group is increased as a high probability exists that a consumer that is already in the offer group will share the offer with a consumer that meets the merchant's target criteria that is not yet part of the offer group. For example, a consumer in the offer group may live in relative proximity to family members and friends with whom the consumer shares the offer. As a result, the social group buying approach utilizes a person's relationship with members of his or her social circle to reduce the cost and effort associated with a merchant trying to pre-qualify leads and marketing targeting. Further, in one embodiment, the reward mechanism may be utilized to reward either the quantity or the quality of sharing with members of the consumer's social circle. In another embodiment, the reward mechanism may be utilized to reward both the quantity and the quality of sharing with members of the consumer's social circle.

Figure 1:
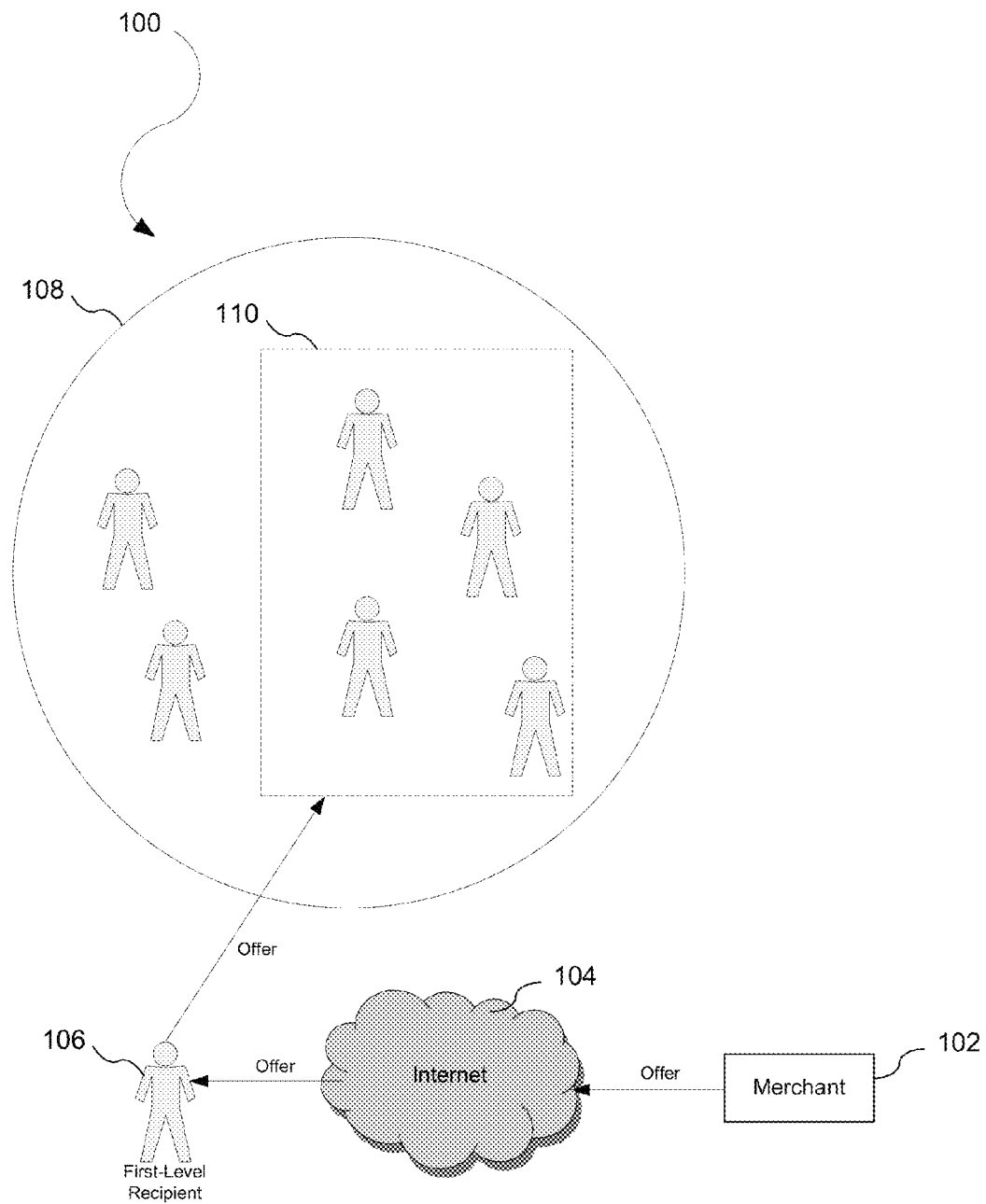
FIG. 1 illustrates a social group buying configuration.

FIG. 1 illustrates a social group buying configuration 100. A merchant 102 provides an offer through a network such as the Internet 104 to a first-level recipient, i.e., the initial offer recipient. The network may include a different type of network than the Internet 104. The first-level recipient has a social circle 108. A subset 110 of that social circle includes people that meet the merchant's target criteria. Accordingly, the first-level recipient is incentivized to provide the offer to the subset 110. Further, the first-level recipient may be penalized for sending the offer to everyone in his or her social circle as the first-level recipient is encouraged to find people in the social circle 108 that may meet the merchant's target criteria.

Figure 2:
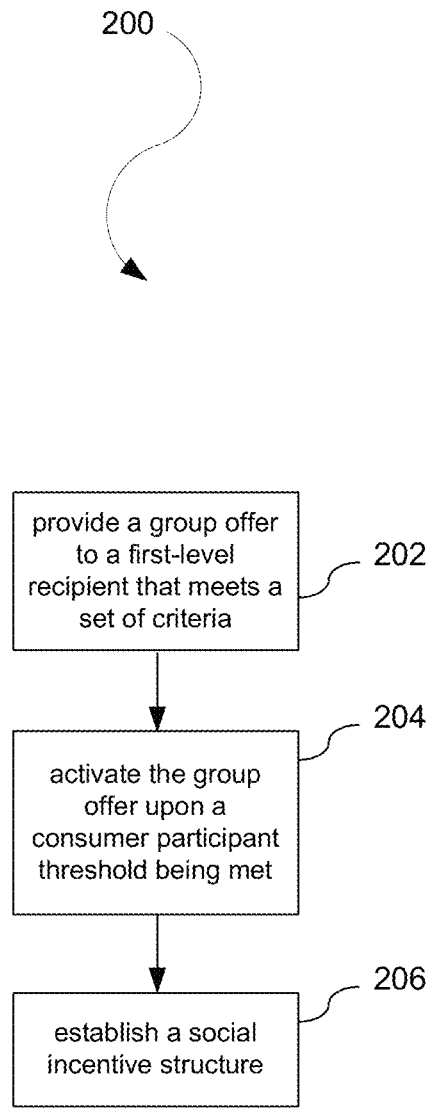
FIG. 2 illustrates a process that may be utilized for social group buying.

FIG. 2 illustrates a process 200 that may be utilized for social group buying. At a process block 202, the process 200 provides a group offer to a first-level recipient that meets a set of criteria. In one embodiment, the set of criteria is defined by the merchant. Further, at a process block 204, the process 200 activates the group offer upon a consumer participant threshold being met. The consumer participant threshold being a number of consumers who need to participate for the offer to be activated. As an example, a merchant that wants to attract new customers may be willing to provide a fifty percent discount for the first twelve months of service to new members who enroll in the service through a social group buying tool. The merchant may set a threshold, e.g., ten thousand new members must join the service through the social group buying service for the offer to be activated. In addition, at a process block 206, the process 200 establishes a social incentive structure. The social incentive structure may be established before providing the group offer, at the time of providing the group offer, after providing the group offer but before activating the group offer, or after activating the group offer. As an example, a merchant may want as wide adoption as possible and may set up the social incentive structure at the time that the offer is provided to simulate viral sharing as part of the offer. As another example, a merchant may send out the offer to first-level recipients only and then utilize the social incentive structure to stimulate additional growth if the merchant's goals were not met in the first wave of the offer campaign. The social incentive structure encourages offer recipients to share the offer with people in their social circle who meet specific qualifications as defined by the offer-creating merchant. The social incentive structure may be based on the merchant's market research and knowledge of its customer base. In one embodiment, the incentive structure may be established in a manner that rewards effective and high-quality offer sharing. In another embodiment, the social incentive structure may be established to penalize spamming or ineffective sharing. In yet another embodiment, the incentive structure may be established to reward effective and high-quality offer sharing, but penalize spamming or ineffective sharing. In another embodiment, the offering merchant may include a description of the attributes for the type of consumer with whom the offering merchant would like the offer shared. In addition, the offering merchant can outline the incentives that a first-level recipient will receive for successfully sharing the offer with consumers who meet their qualifications.

The components of the social incentive structure may be defined in a variety of ways. As an example, the components may include an acceptance ratio, a quality ratio, and an invite quantity. The acceptance ratio may equal the accepted offers to the number of invites. Further, the quality ratio may equal the new customers, who were invited by an initial offer recipient, that match the merchant's customer attributes to the total number of new customers invited by the initial offer recipient. Depending on which of the components are of the highest value to the merchant's business, the merchant can define an incentive formula such that the various components are appropriately rewarded. As an example, the merchant may have determined through market research that owners of a first product are high-value customers for the merchant's business in contrast with owners of a second product. As a result, the merchant may want to encourage initial offer recipients to share the merchant's group offer with members of the social circle of the initial offer recipient who have a particular user profile. For instance, the user profile may be that the consumer in the social circle has never been a member of the service provided by the merchant and owns the first product. To incentivize sharing to consumers with this user profile, the merchant may include a description of the type of consumers who the merchant hopes to attract with this offer. In addition, the merchant may outline the incentive rewards in the offer so that first-level recipients, i.e., initial offer recipients who attract additional subscribers to the group buying program understand that they will be able to earn a sliding scale discount that increases based on the social incentive formula defined by the merchant. Further, the merchant may indicate that if the first-level recipient spams his or her social circle or scores especially poorly on the social incentive formula defined by the merchant, the offer (or discount) may be reduced below the baseline amount, e.g., below fifty percent off the first twelve months. An example of activity for which the first-level offer recipient may be penalized is the first-level recipient emails his or her entire social circle without thought or pre-qualification, effectively spamming recipients and ultimately generating no new participants in the group.

Figure 3:
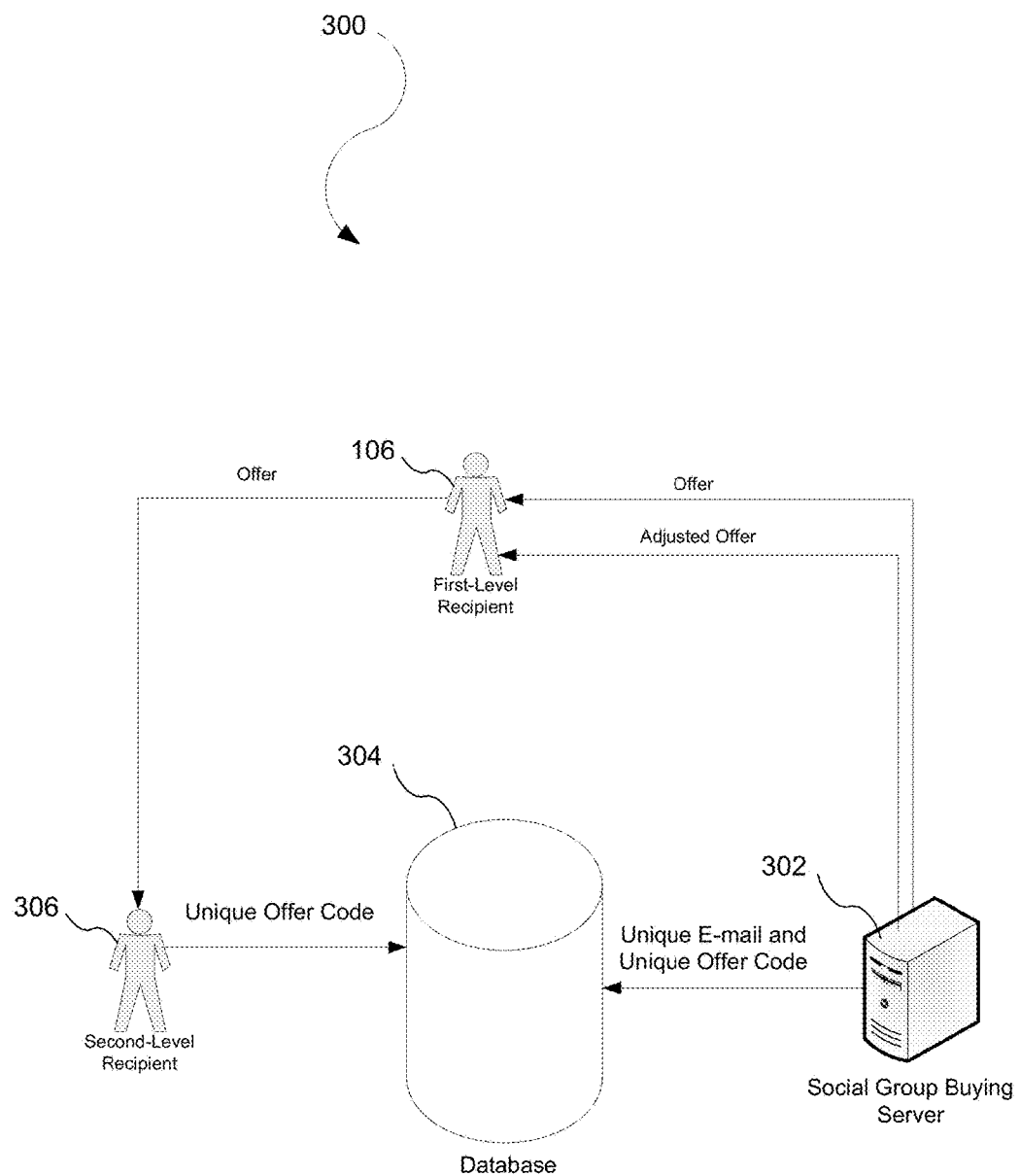
FIG. 3 illustrates a social group buying incentive system.

FIG. 3 illustrates a social group buying incentive system 300. In one embodiment, the social group buying system 300 has a social group buying server 302 that has a processor, which generates a unique communication e-mail and offer for each new second-level recipient 306 that receives the offer from the first-level recipient. An example of the unique communication is a unique e-mail. However, unique communication can be any format based upon a system's capabilities and/or a second-level recipient's preferences. Other examples include a text message, web site interaction, a telephone call, a letter, etc. Accordingly, the processor tracks how many second-level recipients the first-level recipient shares the offer with. The social group buying server 302 provides the offer to the first-level recipient 106. The first-level recipient 106 then provides the offer to the second-level recipient 306. The social group buying server 302 may store the unique e-mail and offer code in a database 304. The social group buying server 302 determines how many of the second-level recipients act on the offer by looking the unique offer code up in the database 304. In one embodiment, the reward that the first-level recipient receives increases with the number of second-level recipients who respond to the offer. Further, in one embodiment, the social group buying server 302 looks at the second-level recipient's attributes. For example, the social group buying server 302 can confirm that the second-level recipient was not previously a member of the service. The social group buying server 302 can also determine if the second-level recipient owns the first product by asking the second-level recipient for confirmation. After the first-level recipient's social sharing effectiveness has been calculated by the scoring methodology of the social group buying system 300, the first-level recipient will receive an adjusted offer.

Although the sharing incentive mechanism provided herein has been described for the first-level recipient, the sharing incentive mechanism may also be utilized for other recipients, e.g., a second-level recipient, a third-level recipient, etc. For example, a second-level recipient may be incentivized to share the offer in his or her social circle.

The social group buying configurations provided for herein reward sharing and virality from a multi-dimensional and sophisticated scoring-based approach. As a result, the merchant not only attracts more participants, but more importantly attracts participants that are deemed high quality based on the merchant's own criteria.

The social group buying methodology described herein is not limited to the context of social group buying. For example, the methodology may be utilized as a scoring mechanism to be a filter as to how data is routed to different people in a social network. The social network may be formal or informal. For example, the social network may be informal such as a user's group of friends and/or family that is not reliant on a created online structure. The social network may be additionally or alternatively a created online structure that is established for the purpose of online interactions. The social network allows a user to invite people with whom he or she has an established relationship since he or she would have familiarity with the invitee's tastes, preferences, buying intent, and/or buyer qualification.

Further, the network may be distributed or centralized. An example of a distributed system is a mesh network or a peer-to-peer system where the social incentive structure is effectively bundled with the communication or resides on each node. An example of a centralized system is a system where the social incentive structure resides on one or more centralized servers.

Figure 4:
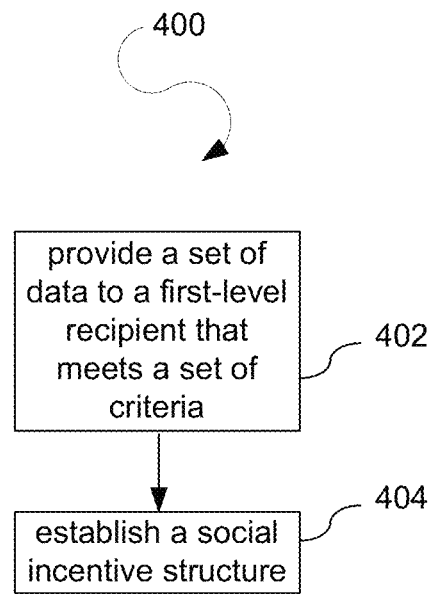
FIG. 4 illustrates a process that may be utilized to route information in a social network.

FIG. 4 illustrates a process 400 that may be utilized to route information in a social network. At a process block 402, the process 400 provides a set of data to a first-level recipient that meets a set of criteria. In one embodiment, the criteria are defined by the offering company. In another embodiment, the criteria are defined by the group buying company. In yet another embodiment, the criteria are defined by the offering company and the group buying company. The first-level recipient is a member of an online social network. Further, at a process block 404, the process 400 establishes a social incentive structure that provides (i) a reward to the first-level recipient if the first-level recipient shares the set of data with a second-level recipient that is in the social network and meets a set of qualifications, and provides (ii) a penalty to the first-level recipient if the first-level recipient shares the set of data with a different second-level recipient that is in the social network without meeting the set of qualifications. As illustrated in FIG. 3, the offer is provided to the first-level recipient 106, but then may be adjusted based on the social incentive structure. The adjusted offer may include a reward and/or a penalty. The process 400 may be utilized to influence behavior in a social network. For example, obtaining new members for the social network may be encouraged with a reward whereas spamming may be discouraged through a penalty. Further, an organization may utilize a scoring algorithm to determine how prominently certain search results will show up as a result of a search of a term. In addition, the process 400 may be utilized to promote the viral spread of advertising.

Figure 5:
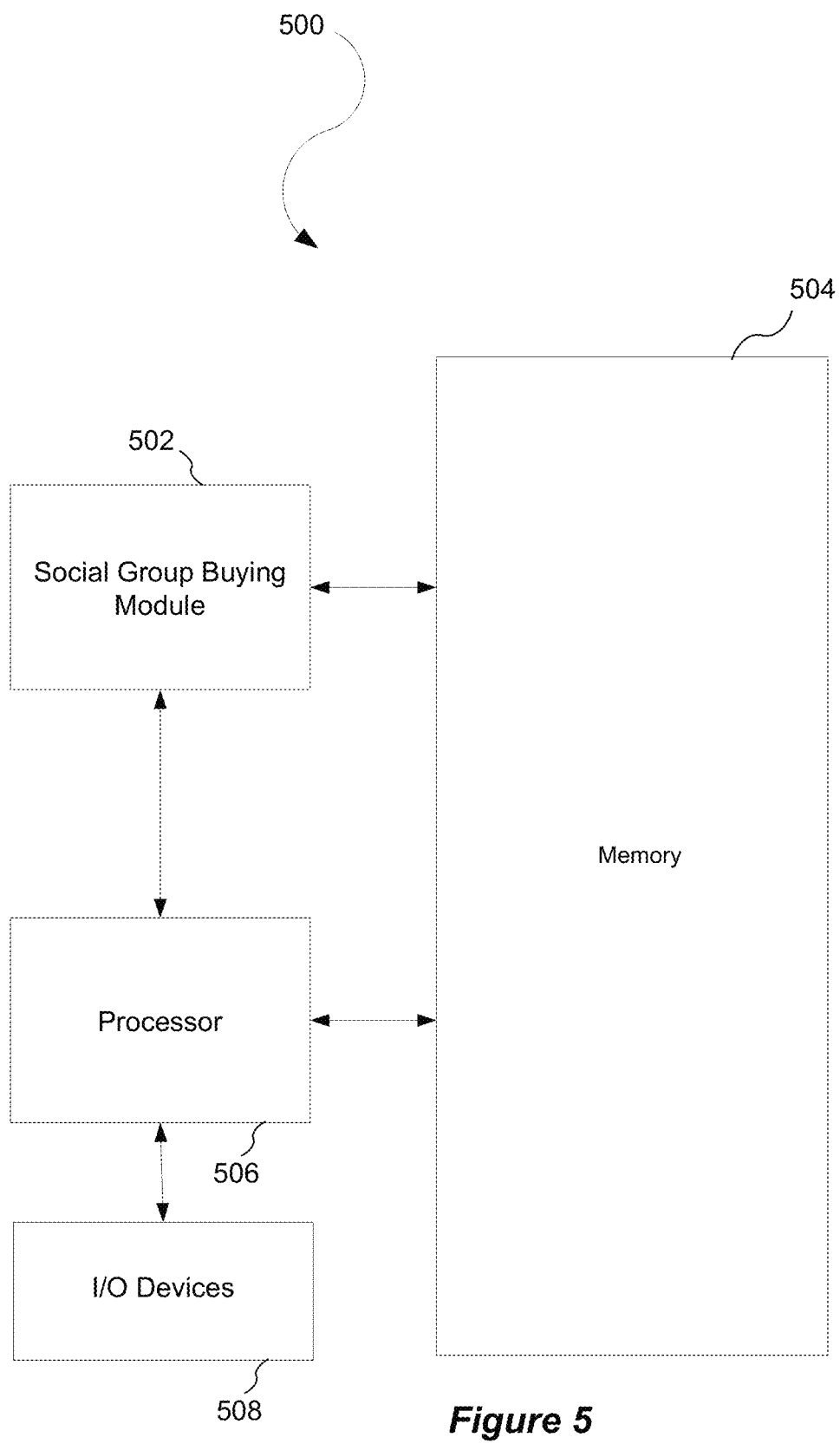
FIG. 5 illustrates a system configuration that may be utilized for social group buying.

FIG. 5 illustrates a system configuration 500 that may be utilized for social group buying. In one embodiment, the social group buying module 502 interacts with a memory 504. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products.

Therefore, it is to be understood that, within the scope of the appended claims, the present processes, systems, and computer program products may be practiced other than as specifically described herein.

I claim:

1. A computer program product for increasing a number of participants in groups to which electronic offers are targeted, the computer program product comprising a computer useable storage medium having a computer readable program that when executed on a computer causes the computer to:
   generate a group offer by the computer for communication via a computer network to a first-level recipient that meets a set of criteria;
   activate the group offer responsive to a determination made by the computer that a consumer participant threshold is met, the consumer participant threshold equaling a number of consumers;
   receive a set of qualifications from the offering merchant by the computer that indicates a type of consumer with whom the offering merchant would like the first-level recipient to share the group offer;
   generate a qualification communication by the computer for receipt by the first-level recipient to present the set of qualifications to the first-level recipient to enable the first-level recipient to determine whether or not to share the group offer with a second-level recipient;
   store the generated qualification communication in a database along with a unique offer code for the second-level recipient;
   communicate the generated qualification communication by the computer to the first-level recipient via the computer network;
   cause presentation of the generated qualification communication to the first-level recipient effective to reduce an amount of communications provided over the computer network to non-participants of the group offer;
   establish, by the computer, a social incentive structure that provides a reward to the first-level recipient after determining that:
      the first-level recipient shares the group offer with the second-level recipient;
      the second-level recipient receives the group offer from the first-level recipient and is in a social circle associated with the first-level recipient; and
      the second-level recipient meets the set of qualifications provided to the first-level recipient;
   calculate a score that reflects sharing effectiveness of the first-level recipient including determining whether the second-level recipient acted upon the group offer by performing a look up in the database for the unique offer code for the second-level recipient; and
   provide the reward to the first-level recipient in accordance with the social incentive structure and the calculated score.

2. The computer program product of claim 1, wherein the social incentive structure also penalizes the first-level recipient for sharing the group offer with a different second-level recipient that is in the social circle associated with the first-level recipient, but does not meet the set of qualifications.

3. The computer program product of claim 2, the penalty including reducing a discount to the first-level recipient below a baseline amount.

4. The computer program product of claim 1, wherein the social incentive structure includes an acceptance ratio that equals accepted offers to number of invites.

5. The computer program product of claim 1, wherein the social incentive structure includes a quality ratio that equals new customers invited by the first-level recipient that match a merchant's customer attributes to total number of new customers invited by the first-level recipient.

6. The computer program product of claim 1, wherein the computer readable program when executed on the computer is further caused to, upon the first-level recipient sharing the group offer with the second-level recipient that is in the social circle and meeting the set of qualifications, (i) generate a unique communication for the second-level recipient, and (ii) store the unique communication in the database.

7. The computer program product of claim 6, wherein the computer readable program when executed on the computer is further caused to communicate the unique communication for the second-level recipient via the computer network.

8. The computer program product of claim 1, wherein the social incentive structure includes a sliding scale discount that increases and decreases based on a social incentive formula defined by the merchant.

9. The computer program product of claim 1, the set of qualifications including a user profile, the user profile including a description of a type of consumer the offering merchant hopes to attract with the group offer.

10. A method implemented by a computer for increasing a number of participants in groups to which electronic offers are targeted, the method comprising:
   under control of a processor of the computer configured with executable instructions:
   generating a group offer by the computer for communication via a computer network to a first-level recipient that meets a set of criteria;
   activating the group offer responsive to a determination made by the computer that a consumer participant threshold is met, the consumer participant threshold equaling a number of consumers;
   receiving a set of qualifications from the offering merchant by the computer that indicates a type of consumer with whom the offering merchant would like the first-level recipient to share the group offer;
   generating a qualification communication by the computer for receipt by the first level recipient to present the set of qualifications to the first-level recipient to enable the first-level recipient to determine whether or not to share the group offer with a second-level recipient;
   storing the generated qualification communication in a database along with a unique offer code for the second-level recipient;
   communicating the generated qualification communication by the computer to the first level recipient via the computer network;
   causing presentation of the generated qualification communication to the first-level recipient effective to reduce an amount of communications provided over the computer network to non-participants of the group offer;
   establishing, by the computer, a social incentive structure that provides a reward to the first-level recipient after determining that:
      the first-level recipient shares the group offer with the second-level recipient;
      the second-level recipient receives the group offer from the first-level recipient and is in a social circle associated with the first-level recipient; and
      the second-level recipient meets the set of qualifications provided to the first-level recipient;

calculating a score that reflects sharing effectiveness of the first-level recipient including determining whether the second-level recipient acted upon the group offer by performing a look up in the database for the unique offer code for the second-level recipient; and providing the reward to the first-level recipient in accordance with the social incentive structure and the calculated score.

11. The method of claim 10, further comprising penalizing the first-level recipient for sharing the group offer with a different second-level recipient that is in the social circle associated with the first-level recipient, but does not meet the set of qualifications.

12. The method of claim 10, wherein the social incentive structure includes an acceptance ratio that equals accepted offers to number of invites.

13. The method of claim 10, wherein the social incentive structure includes a quality ratio that equals new customers invited by the first-level recipient that match a merchant's customer attributes to total number of new customers invited by the first-level recipient.

14. The method of claim 10, further comprising, upon the first-level recipient sharing the group offer with the second-level recipient that is in the social circle and meets the set of qualifications, (i) generating a unique communication for the second-level recipient, and (ii) storing the unique communication in the database.

15. The method of claim 14, further comprising communicating the unique communication for the second-level recipient via the computer network.

16. A system implemented for increasing a number of participants in groups to which electronic offers are targeted comprising:
a processor; and
memory storing instructions that, responsive to execution by the processor, causes a social group buying module of the system to:
generate a group offer by the social group buying module for communication via a computer network to a first-level recipient that meets a set of criteria;
activate the group offer responsive to a determination made by the social group buying module that a consumer participant threshold is met, the consumer participant threshold equaling a number of consumers;
receive a set of qualifications from the offering merchant by the social group buying module that indicates a type of consumer with whom the offering merchant would like the first-level recipient to share the group offer;
generate a qualification communication by the social group buying module for receipt by the first level recipient to present the set of qualifications to the first-level recipient to enable the first-level recipient to determine whether or not to share the group offer with a second-level recipient;
store the generated qualification communication in a database along with a unique offer code for the second-level recipient;
communicate the generated qualification communication by the social group buying module to the first level recipient via the computer network;
cause presentation of the generated qualification communication to the first-level recipient effective to reduce an amount of communications provided over the computer network to non-participants of the group offer;

establish, by the social group buying module, a social incentive structure that provides a reward to the first-level recipient after determining that:
the second-level recipient receives the group offer from the first-level recipient and is in a social circle associated with the first-level recipient;
the second-level recipient meets the set of qualifications provided to the first-level recipient; and
the first-level recipient shares the group offer with the second-level recipient;
calculate a score that reflects sharing effectiveness of the first-level recipient including determining whether the second-level recipient acted upon the group offer by performing a look up in the database for the unique offer code for the second-level recipient; and
provide the reward to the first-level recipient in accordance with the social incentive structure and the calculated score.

17. The system of claim 16, wherein the social incentive structure also penalizes the first-level recipient for sharing the group offer with a different second-level recipient that is in the social circle associated with the first-level recipient, but does not meet the set of qualifications.

18. The system of claim 16, wherein the social incentive structure includes an acceptance ratio that equals accepted offers to number of invites.

19. The system of claim 16, wherein the social incentive structure includes a quality ratio that equals new customers invited by the first-level recipient that match a merchant's customer attributes to total number of new customers invited by the first-level recipient.

20. A computer program product for increasing a number of participants in groups to which electronic offers are targeted, the computer program product comprising a computer useable storage medium having a computer readable program that when executed on a computer causes the computer to:
generate a group offer by the computer for communication via a computer network to a first-level recipient that meets a set of criteria;
activate the group offer responsive to a determination made by the computer that a consumer participant threshold is met, the consumer participant threshold equaling a number of consumers;
receive a set of qualifications from the offering merchant by the computer that indicates a type of consumer with whom the offering merchant would like the first-level recipient to share the group offer;
generate a qualification communication by the computer for receipt by the first level recipient to present the set of qualifications to the first-level recipient to enable the first-level recipient to determine whether or not to share the group offer with a second-level recipient;
store the generated qualification communication in a database;
communicate the generated qualification communication by the computer to the first level recipient via the computer network;
cause presentation of the generated qualification communication to the first-level recipient effective to reduce an amount of communications provided over the computer network to non-participants of the group offer;
establish, by the computer, a social incentive structure that provides a penalty to the first-level recipient after determining that the first-level recipient shares the group offer with the second-level recipient and the second-level recipient does not meet the set of qualifications provided to the first-level recipient;

calculate a score that reflects sharing effectiveness of the first-level recipient including determining whether the second-level recipient met the set of qualifications by performing a look up in the database for attributes of the second-level recipient; and communicate the penalty to the first-level recipient in accordance with the social incentive structure and the calculated score.

* * * * *

UNITED STATES PATENT AND TRADEMARK OFFICE
CERTIFICATE OF CORRECTION

PATENT NO. : 9,454,763 B2  
APPLICATION NO. : 12/862386  
DATED : September 27, 2016  
INVENTOR(S) : Geoffrey K. Baum Page 1 of 1

It is certified that error appears in the above-identified patent and that said Letters Patent is hereby corrected as shown below:

On the title page item [74], after "Attorney, Agent, or Firm", delete "Wolf-SBMC", insert -- Wolfe-SBMC --, therefor.

Signed and Sealed this
Sixth Day of December, 2016

Michelle K. Lee
*Director of the United States Patent and Trademark Office*